US 8,704,929 B2

(12) United States Patent
Imai (10) Patent No.: US 8,704,929 B2
(45) Date of Patent: Apr. 22, 2014

(54) SYSTEM AND METHOD FOR USER GUIDANCE OF PHOTOGRAPHIC COMPOSITION IN IMAGE ACQUISITION SYSTEMS

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 12/956,459

(22) Filed: Nov. 30, 2010

(65) Prior Publication Data

US 2012/0133816 A1 May 31, 2012

(51) Int. Cl.
*H04N 5/222* (2006.01)
*H04N 5/225* (2006.01)

(52) U.S. Cl.
USPC .............. 348/333.01; 348/207.99; 348/208.6; 348/211.9; 348/240.99; 396/296

(58) Field of Classification Search
USPC ............. 348/333.01, 333.02, 333.03, 333.12, 348/207.99, 208.6, 211.9, 240.99
See application file for complete search history.

(56) References Cited

U.S. PATENT DOCUMENTS

| | | |
|---|---|---|
| 5,831,670 A | 11/1998 | Suzuki |
| 5,873,007 A | 2/1999 | Ferrada Suarez |
| 6,806,906 B1 | 10/2004 | Soga et al. |
| 7,317,485 B1 | 1/2008 | Miyake et al. |
| 7,349,020 B2 * | 3/2008 | Stavely et al. ............ 348/333.02 |
| 7,432,973 B2 * | 10/2008 | Iga ............................ 348/333.03 |
| 7,460,782 B2 | 12/2008 | Chan et al. |
| 7,590,335 B2 | 9/2009 | Kobayashi et al. |
| 7,667,759 B2 | 2/2010 | Suzuki et al. |
| 7,952,618 B2 * | 5/2011 | Kawada ........................ 348/239 |
| 7,973,848 B2 * | 7/2011 | Koh .......................... 348/333.02 |
| 2002/0171746 A1 * | 11/2002 | Stephany et al. ............. 348/239 |
| 2003/0169350 A1 * | 9/2003 | Wiezel et al. ................. 348/239 |
| 2004/0186820 A1 | 9/2004 | Izume et al. |
| 2004/0189849 A1 | 9/2004 | Hofer |
| 2008/0056706 A1 | 3/2008 | Battles et al. |
| 2009/0278958 A1 * | 11/2009 | Bregman-Amitai et al. ........................ 348/231.99 |
| 2010/0201832 A1 * | 8/2010 | Chen et al. .................. 348/222.1 |

OTHER PUBLICATIONS http://service.us.panasonic.com/OPERMANPDF/DMCLZ8.pdf.

* cited by examiner

*Primary Examiner* — Hung Lam
(74) *Attorney, Agent, or Firm* — Canon U.S.A., Inc., IP Division (57) ABSTRACT

A method for capturing an image using an image acquisition device, includes determining that at least one area of an image to be captured has been selected, analyzing geometrical and compositional properties of an area surrounding the at least one area, providing a dynamic compositional guideline based on a result of analyzing the geometrical and compositional properties, and indicating when the image to be captured should be captured based on a position of the dynamic compositional guideline relative to the image to be captured.

16 Claims, 7 Drawing Sheets

Dynamic frame coordinates

SYSTEM AND METHOD FOR USER GUIDANCE OF PHOTOGRAPHIC COMPOSITION IN IMAGE ACQUISITION SYSTEMS

BACKGROUND OF THE INVENTION

1. Field of the Invention

Aspects of the present disclosure relate to an apparatus and method for capturing an image where at least one area of an image to be captured has been selected.

2. Description of the Related Art

The increasing availability of digital cameras has resulted in an increasing number of digital photographs being taken. Camera manufactures have invested enormous efforts in providing better algorithms for exposure control, color balance compensation, sharpening, color rendering, etc. but there has been little effort in aiding users to take pictures with better spatial composition. This has resulted in users ending up with many pictures that are not aesthetically pleasing to view.

In some cases, photographs are viewed as a way for a photographer to convey a particular message, such as a statement, an impression, or an emotion. A good photographer is an author trying to convey the message in a clear, concise and effective way. Like any other message, the message being conveyed by the photographer through a particular photograph needs a main subject (people, animal, plant, building, natural vista, abstract form, etc. . . . ). In order to compose the message it is necessary to include a secondary message that provides context, such as the main subject's surrounding. By combining the subject and the context, a complete message can be created.

In creating the complete message, it is just as important to know what to exclude as knowing what to include. Anything that is not part of the main subject or its associated context is typically only a distraction. In order to give a flavor and style to a particular photograph, the photographer has to consider structural composition by using elements in the scene such as lines, geometry, perspective, color, texture, etc. . . . .

Currently, some commercially available digital cameras address this need by presenting guidelines to the user overlaid in the viewfinder or on the LCD display of the digital camera. The guidelines are horizontal and vertical and divide the image into thirds to aid the user in composing a picture according to the rule of thirds. One such camera allows the user to move the lines so they are aligned with objects in the image. Another camera includes diagonal lines that cross in the lower two thirds of the display and also includes a center square to help with proportions.

Other commercially available digital cameras include an analysis function that analyzes an image in order to suggest compositional corrections to the user. One camera looks for people by analyzing for flesh tones and provides advice by displaying a text warning. Another camera encourages the user to consider the best use of the whole frame by analyzing proportions of the people or objects in relation to strong horizontal or vertical lines. It then provides arrows indicating the directions in which the camera should be moved in order to create a more proportional image. Still yet, another camera analyzes the image to determine general characteristics of the scene and then chooses an appropriate template to overlay on the image thus directing the user in regards to proportion and framing.

After image capture, there are several post-processing tools available to the user that allows the user to alter the composition of the image. Post-processing tasks are typically time consuming and there are certain compositional elements that cannot be altered after the image is taken, such as shooting view point, wider angle shooting, or moving an element in the picture (by arranging elements in the scene). Standard commercially available post-processing applications typically just allow simple operations such as cropping and image rotation in 90-degree steps. An image that is well composed from the beginning will make much more efficient use of the image resolution and require far less post-processing to arrive at a pleasing image.

In light of the above, what is needed are better tools to aid a user in composing aesthetically pleasing and compelling images at the time the images are captured. An image that is well composed from the time it is captured will require less post-processing time and enable a user to obtain an aesthetically pleasing result more efficiently.

SUMMARY OF THE INVENTION

According to one aspect of the invention, a method for capturing an image using an image acquisition device, includes determining that at least one area of an image to be captured has been selected, analyzing geometrical and compositional properties of an area surrounding the at least one area, providing a dynamic compositional guideline based on a result of analyzing the geometrical and compositional properties, and indicating when the image to be captured should be captured based on a position of the dynamic compositional guideline relative to the image to be captured.

Further features of the present disclosure will become apparent from the following description of exemplary embodiments (with reference to the attached drawings).

DETAILED DESCRIPTION OF THE INVENTION

Figure 1:
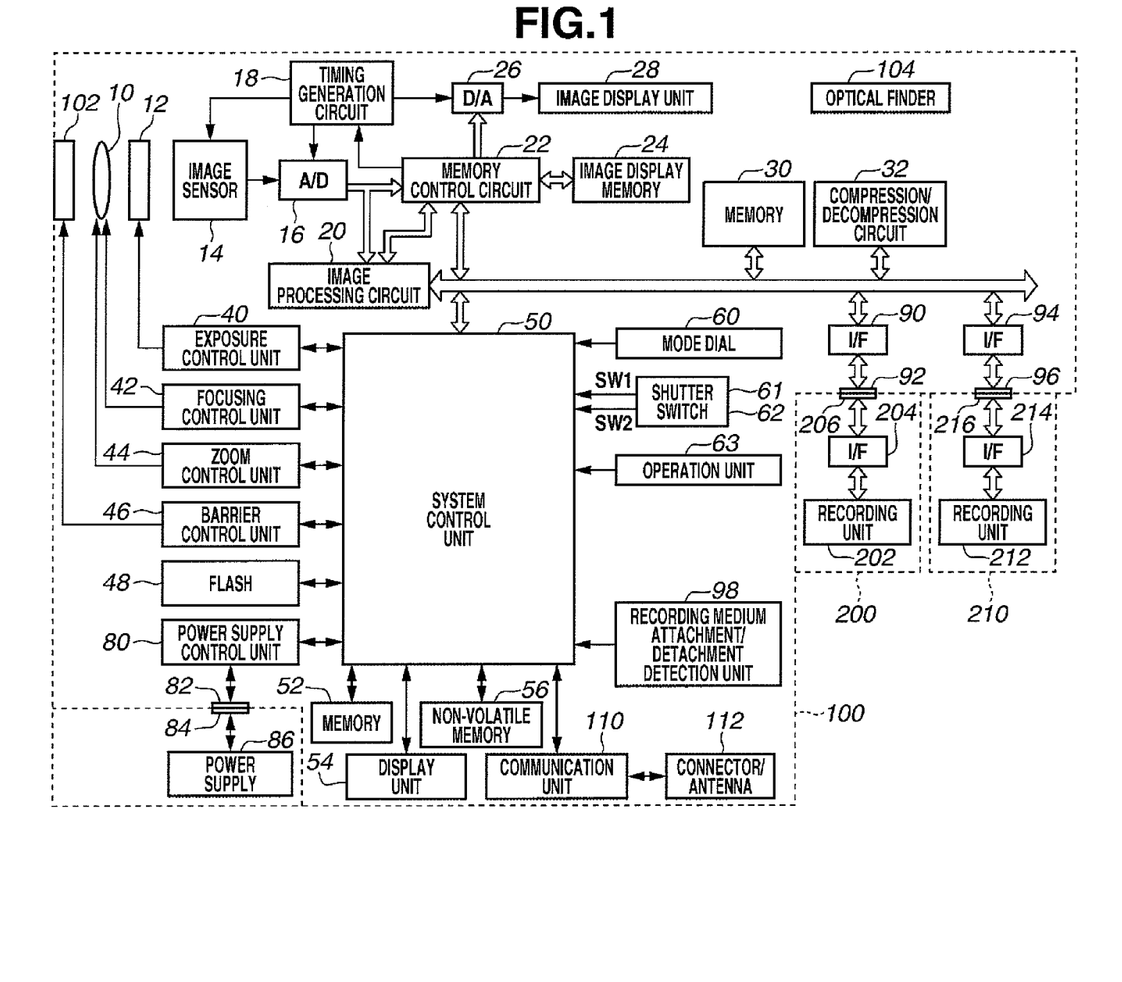
FIG. 1 is a block diagram illustrating an imaging apparatus according to an exemplary embodiment.

FIG. 1 is a representational view illustrating a general configuration of an imaging apparatus according to an exemplary embodiment.

An imaging apparatus 100 includes a protection unit 102, photographic lens 10, a shutter 12, an image sensor 14, an analog to digital (A/D) converter 16, a timing generation circuit 18, and an image processing circuit 20. The protection unit 102 serves as a cover to protect an imaging unit including the photographic lens 10 from soiling and breakage. The shutter 12 includes a diaphragm function. The image sensor 14 converts an optical image to electric signals. The A/D converter 16 coverts an analog signal output from the image sensor 14 to a digital signal. The timing generation circuit 18 supplies a clock signal and a control signal to the image sensor 14, the A/D converter 16, and a digital to analog (D/A) converter 26. The timing generation circuit 18 is controlled by a memory control circuit 22 and a system control unit 50.

The image processing circuit 20 performs predetermined pixel interpolation and color conversion on data received from the A/D converter 16 or the memory control circuit 22. Further, the image processing circuit 20 performs a predetermined calculation using the captured image data. Furthermore, the image processing circuit 20 performs a predetermined calculation using the captured image data and through-the-lens (TTL) auto-white balance (AWB) processing based on the calculation result. In white balance processing, block integration is performed by dividing a video signal into a plurality of blocks and acquiring an integration value of a color signal for each block to calculate the white balance. Further, white search integration is performed by converting a signal value of each pixel in the video signal onto a chromaticity coordinate and acquiring an integration value of the color signal for a predetermined region. A setting of an integration region on the chromaticity coordinate that is used in the white search integration is stored in the image processing circuit 20.

The imaging apparatus 100 further includes the memory control circuit 22, an image display memory 24, the D/A converter 26, and an image display unit 28.

The memory control circuit 22 controls the A/D converter 16, the timing generation circuit 18, the image processing circuit 20, the D/A converter 26, a memory 30 and a compression/decompression circuit 32. The data of the A/D converter 16 is written in the image display memory 24 or the memory 30 via the image processing circuit 20 and the memory control circuit 22, or via the memory control circuit 22.

The image display unit 28 is, for example, a thin-film transistor (TFT) liquid crystal display (LCD). Image data for display that is written in the image display memory 24 is displayed on the image display unit 28 via the D/A converter 26. An electronic finder function can be implemented by sequentially displaying the captured image data using the image display unit 28. Further, the image display unit 28 can arbitrarily switch a display screen on and off according to an instruction from a system control unit 50. If the image display unit 28 turns off the display, power consumption of the imaging apparatus 100 can be greatly reduced.

The imaging apparatus 100 further includes the memory 30, the compression/decompression circuit 32, an exposure control unit 40, a focusing control unit 42, a zoom control unit 44, a barrier control unit 46, a flash unit 48, and the system control unit 50.

The memory 30 stores captured still images and moving images. The memory 30 has a storage capacity large enough to store a predetermined number of still images and a moving image corresponding to a predetermined period. Therefore, a large amount of image data can be written in the memory 30 at high speed in both a continuous shooting mode of continuously shooting a plurality of still images and a panorama shooting mode. Further, the memory 30 can be used as a work area of the system control unit 50.

The compression/decompression circuit 32 compresses and decompresses the image data using adaptive discrete cosine transform (ADCT). The compression/decompression circuit 32 reads an image stored in the memory 30 and compresses or decompresses the image, and writes the processed data in the memory 30.

The system control unit 50 controls the entire imaging apparatus 100. In one embodiment, the system control unit 50 is a single central processing unit. In another embodiment, the system control unit includes multiple central processing units. The exposure control unit 40 controls the shutter 12 that includes the diaphragm function. Further, the exposure control unit 40 includes a flash light amount control function in cooperation with the flash unit 48. The focusing control unit 42 controls focusing of the photographic lens 10. The exposure control unit 40 and the focusing control unit 42 are controlled by a TTL system.

More specifically, the system control unit 50 performs auto-focus (AF) processing, automatic exposure (AE) processing, and electronic flash pre-emission (EF) processing according to the TTL system by controlling the exposure control unit 40 and the focusing control unit 42 based on a calculation result obtained by the image processing unit 20. The zoom control unit 44 controls zooming of the photographic lens 10. The barrier control unit 46 controls an operation of the protection unit 102. The flash unit 48 includes a function of emitting AF auxiliary light and the light amount control function.

Moreover, the imaging apparatus 100 includes a memory 52, a display unit 54, and a non-volatile memory 56.

The memory 52 stores constants, variables, and programs to be used in operations of the system control unit 50. Further, the memory 52 stores a program diagram to be used in the AE processing. The program diagram is a table that defines a relationship between an aperture diaphragm diameter corresponding to an exposure value and a control value of shutter speed.

The display unit 54 may include an LCD or a speaker that displays an operation state or a message using characters, images, and sound according to execution of a program by the system control unit 50. One display unit 54 or a plurality of display units 54 may be provided near an operation unit 63 of the imaging apparatus 100 so that it is easily visible for a user. The display unit 54 may be configured as a combination of an LCD, a light-emitting diode (LED), and a sound generator. A part of the functions of the display unit 54 is installed within an optical finder 104.

Display contents of the display unit 54 which are displayed on the LCD may include indications of selected areas of interest, single shot/continuous shooting, self timer, a compression rate, a number of recorded pixels, a number of recorded shots, a remaining number of shots, a shutter speed, an aperture value, and exposure correction.

Further, the display unit 54 may display on the LCD, indications such as, flash, red-eye reduction, macro shooting, buzzer setting, remaining amount of a clock battery, remaining amount of batteries, error information, information in a plurality of digits, a detached/attached state of a recording medium, a communication interface operation, and date and time.

The display contents of the display unit 54 that are displayed in the optical finder 104 may include indications of in-focus, camera-shake warning, flash charge, shutter speed, aperture value, and exposure correction.

The non-volatile memory 56 is an electrically erasable and recordable memory such as an electrically erasable programmable read-only memory (EEPROM).

The imaging apparatus 100 further includes a mode dial 60, a shutter switch (SW1) 61, a shutter switch (SW2) 62, and the operation unit 63 which are input units for a user to input various operation instructions to the system control unit 50. Such input units are configured with a single device such as a switch, a dial, a touch panel, pointing using line-of-sight detection, and a speech recognition apparatus or a combination of a plurality of these devices.

The mode dial 60 can be used to specify switching between functional modes such as power off, automatic shooting mode, shooting mode, panoramic shooting mode, composition guidance mode, reproduction mode, multiple screen reproducing/erasing mode, and personal computer (PC) connection mode.

The shutter switch (SW1) 61 is switched on by a half stroke of a shutter button (not illustrated) and instructs start of AF processing, AE processing, AWB processing, and EF processing.

The shutter switch (SW2) 62 is switched on by a full stroke of the shutter button (not illustrated) and instructs start of a series of processing. The series of processing include exposure processing to write signals read from the image sensor 14 into the memory 30 via the A/D converter 16 and the memory control circuit 22, developing processing employing calculations performed by the image processing circuit 20 and the memory control circuit 22, and recording processing. In the recording processing, the image data read from the memory 30 is compressed by the compression/decompression circuit 32 and then written into the recording media 200 and 210.

The operation unit 63 includes various buttons and touch panels, such as a menu button, a set button, a macro selection button, a multi-screen reproduction and page-advance button, a flash setting button, and a single-shot/serial-shot/self-timer selection button. Further, the operation unit 63 includes a forward (+) menu item selection button, a backward (−) menu item selection button, a forward (+) reproduction image search button, a backward (−) reproduction image search button, a shooting quality selection button, an exposure correction button, and a date/time set button.

The imaging apparatus 100 further includes a power supply control unit 80, connectors 82 and 84, a power supply 86, interfaces 90 and 94, the optical finder 104, a communication unit 110, a connector (antenna) 112, and a recording medium attachment/detachment state detection unit 98.

The power supply control unit 80 includes a battery detection circuit, a direct current (DC)-DC converter, and a switch circuit for switching the blocks to be energized. The power supply control unit 80 detects the attached/detached state of the battery, a battery type and the remaining battery power level, and controls the DC-DC converter based on the detection result and an instruction from the system controller 50. The power supply control unit 80 then supplies a necessary voltage for a necessary period to each of the units including the recording medium. The power supply 86 may include a primary battery such as an alkaline battery or a lithium battery, a secondary battery such as a BNiCd battery, an NiMH battery, or an Li battery, and an alternate current (AC) adapter.

Interfaces 90 and 94 transmit and receive data to and from the recording media 200 and 210 such as a memory card or a hard disk. The connectors 92 and 96 connect the imaging apparatus 100 and the recording media 200 and 210. The recording medium attachment/detachment detection unit 98 detects whether the recording medium 200 or the recording medium 210 is connected to the connector 92 or the connector 96. The present exemplary embodiment describes a case where there are two systems of interfaces and connectors for attaching the recording medium. However, there can be any number of systems of interfaces and connectors for attaching the recording medium. Further, interfaces and connectors pursuant to different standards may be combined.

Cards in conformity with Personal Computer Memory Card International Association standards (PCMCIA cards) or cards in conformity with compact flash (CF) card standards may be used as the interfaces and connectors. In such a case, various communication cards such as a local area network (LAN) card, a modem card, a universal serial bus (USB) card, an Institute of Electrical and Electronics Engineers (IEEE) 1394 card, a P1284 card, a small computer system interface (SCSI) card, and a personal handyphone system (PHS) are connected. According to this configuration, image data and management information attached to the image data can be transmitted and received between other peripheral devices such as a computer and a printer.

The optical finder 104 is a window for confirming an object to be captured without using the electronic viewfinder function of the image display unit 28. A part of the functions of the display unit 54 including an indication of in-focus state, a camera shake warning, a flash charge state, a shutter speed, an aperture value, and exposure correction are displayed inside the optical finder 104.

The communication unit 110 includes various communication functions such as Recommended Standard (RS) 232C, USB, IEEE 1394, P1284, SCSI, modem, LAN, and wireless communication.

The connector (antenna) 112 connects the imaging apparatus 100 with other devices via the communication unit 110. The connector 112 functions as an antenna when performing wireless communication.

The recording media 200 and 210 such as the memory card or the hard disk are detachably attached to the imaging apparatus 100. The recording media 200 and 210 include recording units 202 and 212 configured by a semiconductor memory or a magnetic disk, and interfaces 204 and 214 respectively. Further, the recording media 200 and 210 includes connectors 206 and 216 for connecting with the imaging apparatus 100.

Figure 2A:
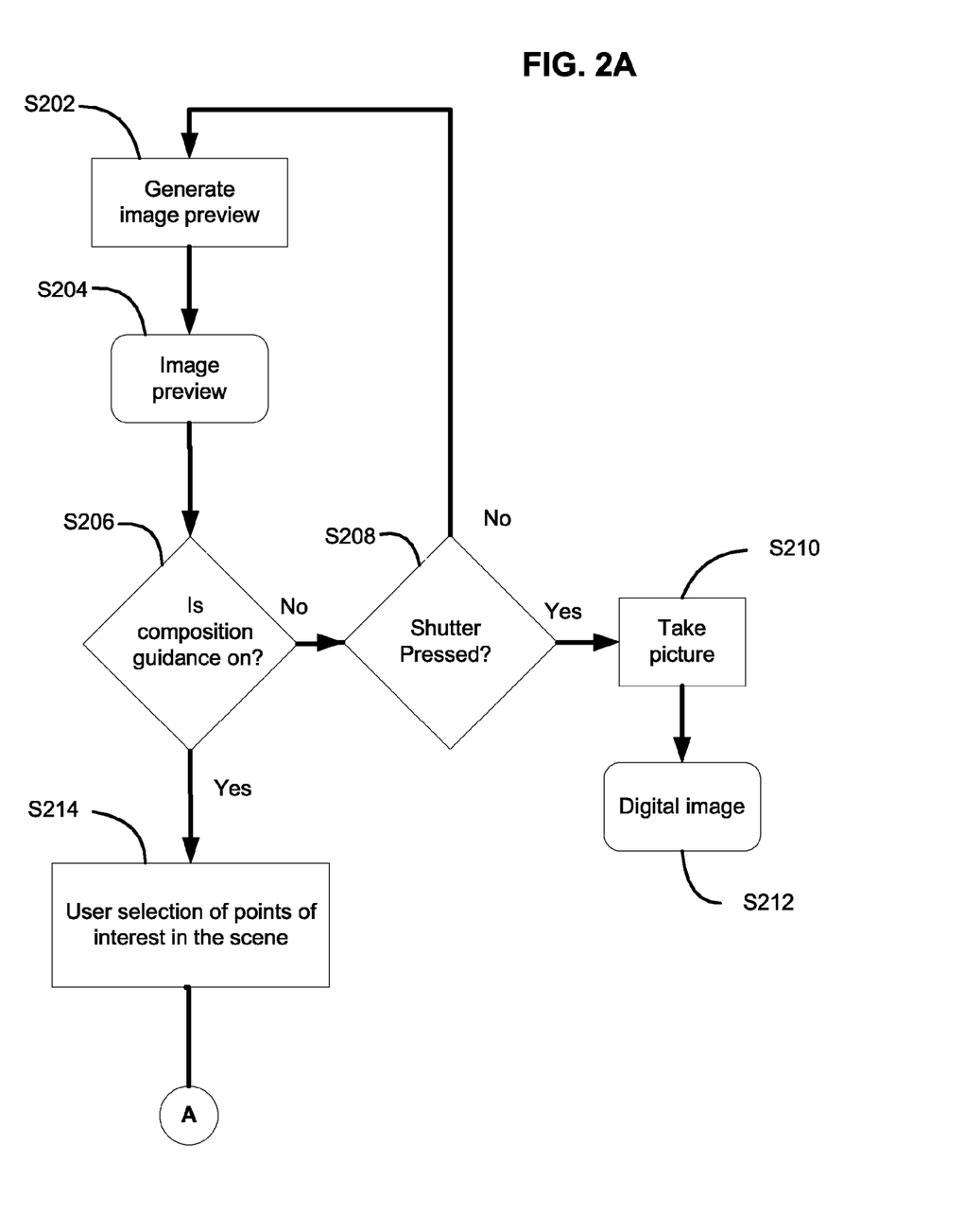
FIGS. 2A-2B re flow diagrams illustrating a method of providing compositional guidance to a user capturing an image according to an exemplary embodiment.
Figure 2B:
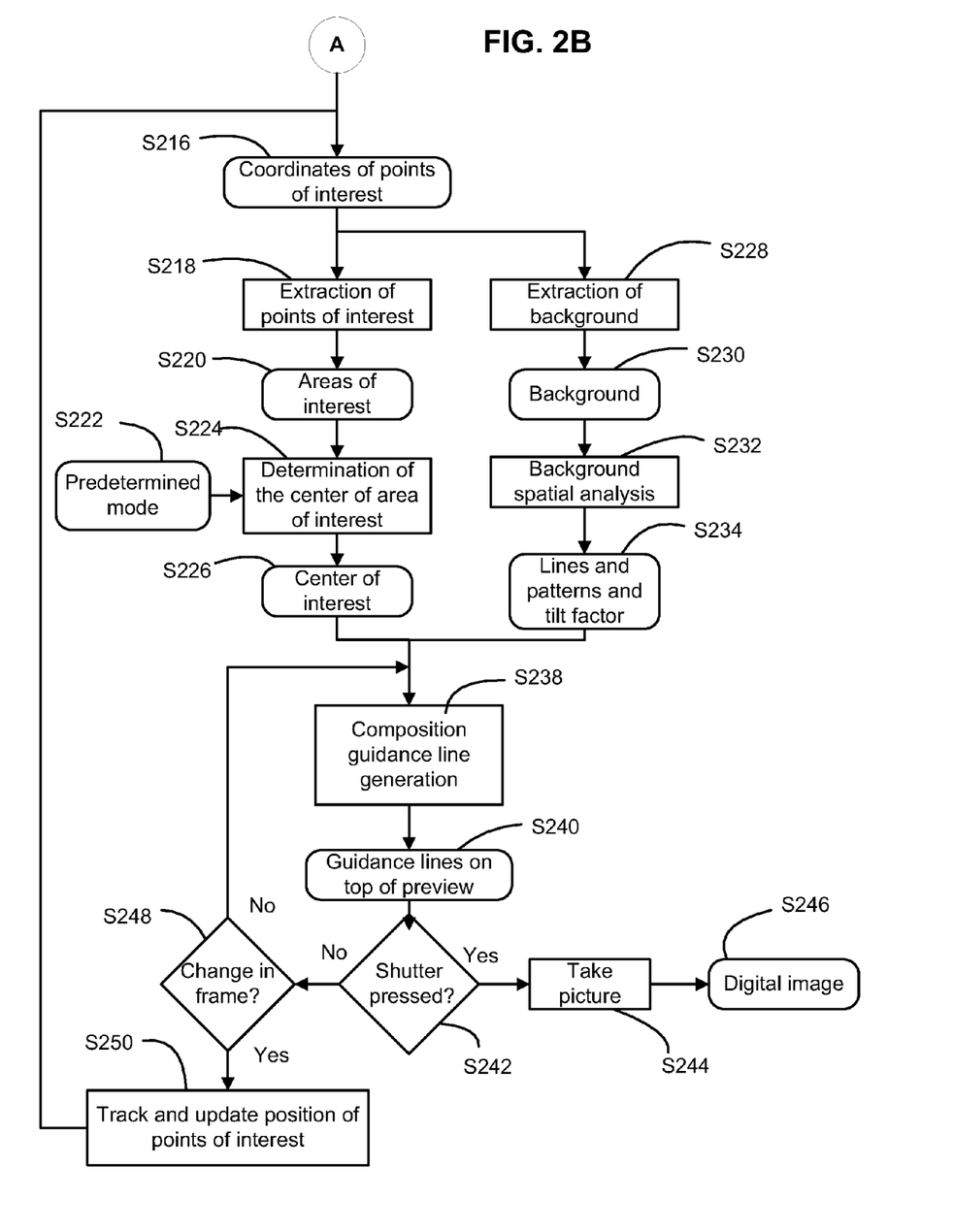

FIGS. 2A-2B illustrate a method of providing compositional guidance to a user capturing an image using image capturing apparatus 100 according to an exemplary embodiment. First, in step S202, a preview image is generated. Generating preview images is well known in the art, and any known method for generating a preview image that would enable practice of the present embodiment is applicable. Thus, a detailed description of this step is omitted herein.

Next, in step S204, the preview image is displayed. In step S206 a determination is made if the compositional guidance settings have been placed in the "on" position. If the compositional guidance setting has not been placed in the "on" position, then in step S208, a determination is made whether the shutter switch 62 has been pressed. If shutter switch 62 has been pressed, then flow proceeds to step S210, where a digital image S212 of a subject is captured.

If, in step S206, the compositional guidance system has been placed in the "on" position, in step S214, the user selects one or more points of interest in the image currently being previewed. In another embodiment, if the user does not select a point of interest, the image capturing apparatus 100 automatically determines a likely point or points of interest by analyzing the image and identifying strong features.

In step S216, the point or points of interest are identified by x-y coordinates. Then, in step S218, a process is performed on the image area surrounding the x-y coordinates of the point or points of interest in order to determine significant features. There are many known methods in the art to determine significant features. For example, one method determines the average colors in the area surrounding the selection in all color channels and then extracts every contiguous point in the frame with color channel values that are within the average colors of the area surrounding the point or points of interest. In addition to this example, any other known method that would enable practice of the present embodiment is applicable.

The identification of these significant features allows for the determination, in step S220, of an area surrounding the x-y coordinates as the area of interest for each point. In step S222, a pre-determined mode of calculation is identified either by prior user selection or by default. The pre-determined modes of calculation include, but are not limited to, one of the following: center of gravity, geographic center, etc. Next, in step S224, the identified mode of calculation is used to calculate the center of the area of interest identified in step S220. In step S226, the center of each area of interest is identified using the calculated center of the area of interest.

Steps S228 through S234 are performed in parallel to the steps S218 through S226. Turning to step S228, the background of the image is extracted and areas of the background to be analyzed are then identified in step S230. A spatial analysis of the background is performed in step S232 to determine the lines, patterns, and tilt factors of s234. Lines and patterns are associated with the structure of the image and the angle of the lines and patterns in relation to a horizontal line would define the tilt factor that has to be compensated.

Flow then proceeds to step S238, where the composition guidance line is generated. The composition guidance line is generated based on information about the center of the area of interest, the lines and patterns in the background, and predetermined rules. The predetermined rules are identified in, and include, but are not limited to, rules of thirds, avoidance of centering dominant vertical, horizontal or diagonal edge, etc. In step S240, the generated composition guidance line is superimposed over the preview image.

In step S242, a determination is made whether shutter switch 62 has been pressed. If shutter switch 62 has been pressed, then a digital image S246 of a subject is captured in step S244. If shutter switch 62 is not pressed then, in step S248, a check is made whether the user has changed the framing. If the user changed the framing, which can include changes in tilt or zoom, then in step S250, the resulting changes to the points of interest are tracked and updated. The process then returns to step S216. If there are no changes in the framing, then the process returns to S238.

Figure 3A:
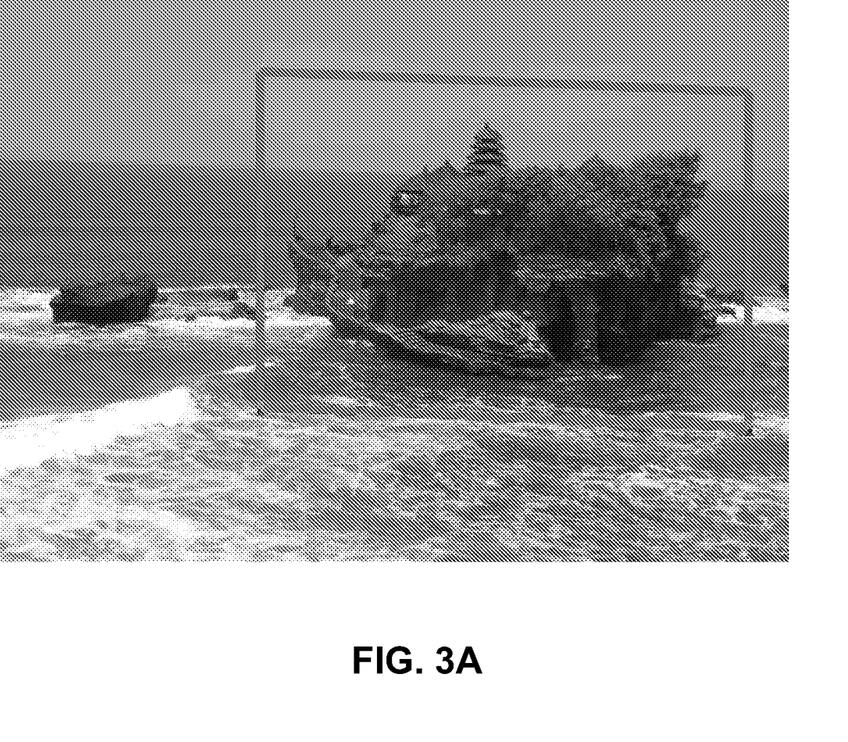
FIG. 3A is an example of a compositional guidance polygon overlaid over an image.
Figure 3B:
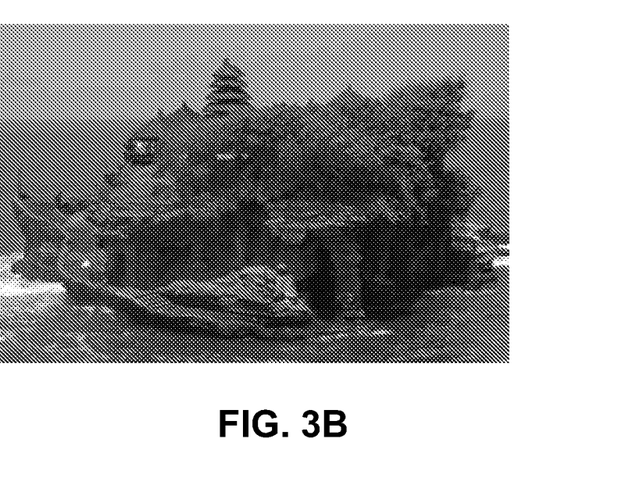
FIG. 3B is an example of a final image after application of the compositional guidance.

FIGS. 3A and 3B illustrate exemplary images and are provided for example purposes only.

FIG. 3A, illustrates an example of a preview image with a compositional guidance polygon overlaid on an image. As illustrated in the image, the horizon is slightly tilted and not perfectly horizontal, and the main object of interest, the island, needs to be more prominent in the image in order to make better use of the image resolution. FIG. 3B illustrates a final image resulting from the user making appropriate adjustments indicated by the compositional guidance.

The compositional guidance in the present example applies the Rule of Thirds to the selected point of interest in the image, i.e., the island, to correct the tilted horizon. In the present case, under the Rule of Thirds, one should imagine the image as divided into nine equal parts by two equally spaced horizontal lines and two equally spaced vertical lines, with important compositional elements placed along these lines or their intersection(s).

Figure 4A:
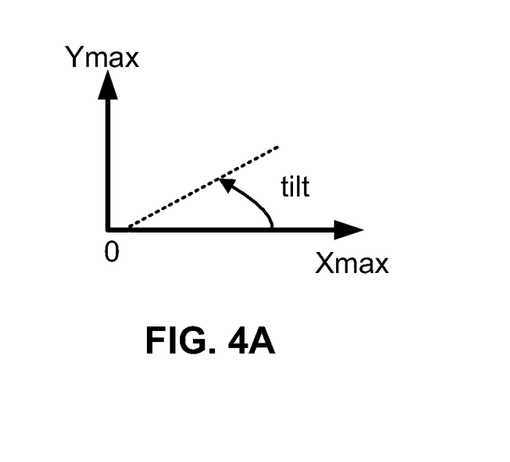
FIG. 4A is an illustration of the coordinate system used in the compositional guidance method according to an exemplary embodiment.
Figure 4B:
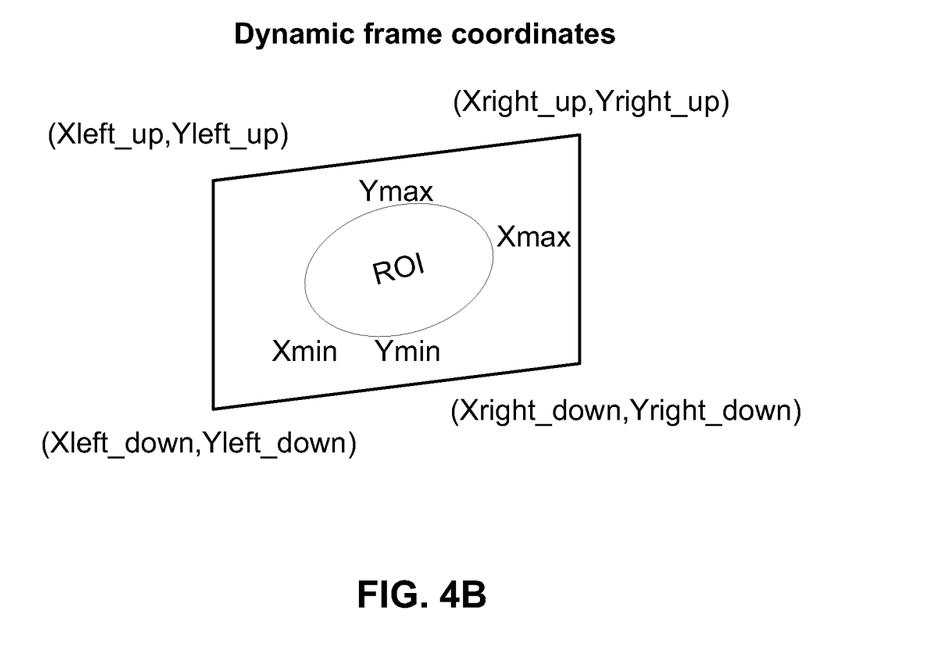
FIG. 4B is an illustration of the calculated vertices of the compositional guidance polygon according to an exemplary embodiment.

The coordinate system used in the present example is illustrated in FIG. 4A. Per FIG. 4A, the origin is set at the lower left corner of the image, the x-axis lies in the horizontal direction, and the y-axis lies in the vertical direction. The tilt is measured as an angle increasing from 0 degrees when parallel to the x-axis to 90 degrees when parallel with the y-axis. FIG. 4B identifies the coordinates of the vertices of the compositional guidance polygon and the coordinates of the Region of Interest (ROI).

Figure 5:
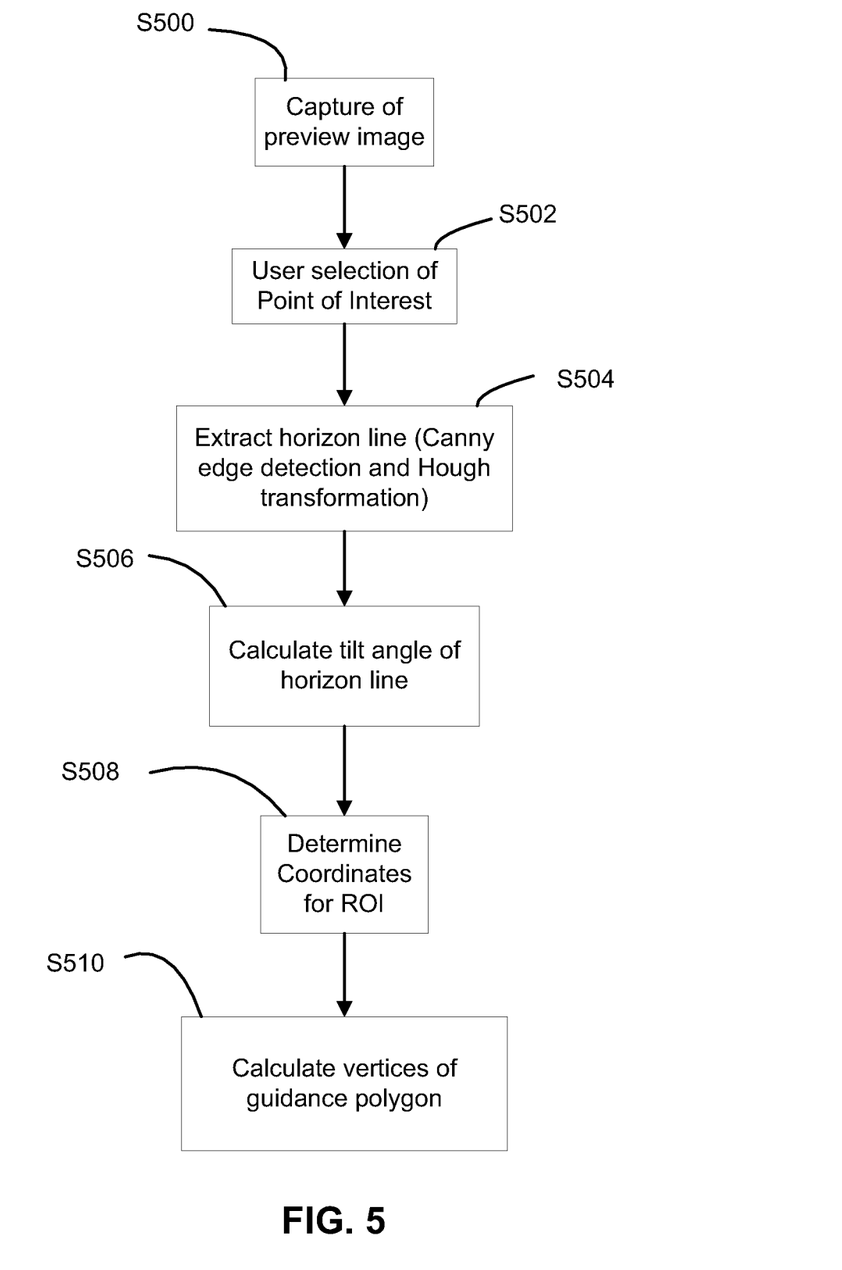
FIG. 5 is a flowchart illustrating the process of computing the location of the compositional guidance polygon according to an exemplary embodiment.

FIG. 5 is a flowchart illustrating the process of computing the location of the compositional guidance polygon according to an exemplary embodiment. First in step S500, a preview image is captured, and then in step S502, the point of interest in the image is selected, e.g., the island in FIG. 3A. In step S504 the horizon line is extracted. This can be performed by a horizon detection algorithm based on color in which the most prominent edge can be found based on Canny edge detection and Hough transformation. (See *Visual Communications and Image Processing* 2008. Edited by Pearlman, William A.; Woods, John W.; Lu, Ligang. Proceedings of the SPIE, Volume 6822, pp. 682220-682220-9 (2008)).

Next, in step S506 the tilt angle of the horizon line is determined as an angle in relation to a perfect horizontal line between two points on the horizon line using the equation $$\text{Tilt angle} = \arctan(yR-yL)/(xR-xL).$$

where xR is the x-coordinate of the horizon edge with the largest x-coordinate value; xL is the x-coordinate value of the horizon edge with the smallest x-coordinate value; yR is the y-coordinate of the horizon edge with the largest y-coordinate value; yL is the y-coordinate value of the horizon edge with the smallest y-coordinate value.

Figure 6:
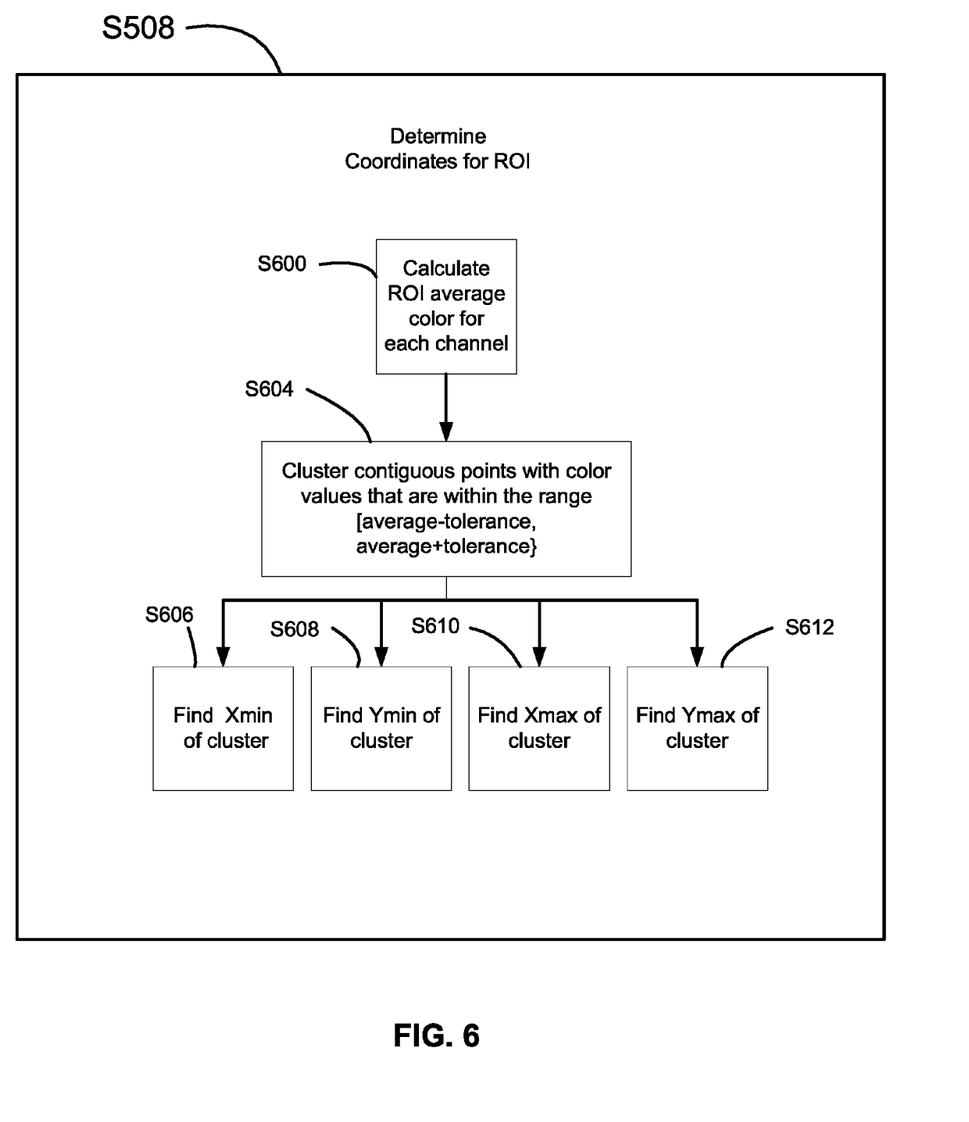
FIG. 6 is an illustration determining the coordinates of the region of interest according to an exemplary embodiment.

In step S508 the coordinates of the region of interest (ROI) are determined. The process for this determination is illustrated in FIG. 6. Turning to FIG. 6, in step S600 the average colors in all color channels present in and around the point of interest are determined. Then, in step S604, the tolerance value, which was preset either by the image capturing apparatus' 100 manufacturer or by a user, is determined, where every contiguous point in the frame with color channel values that are within the average colors of the ROI and within the preset tolerance are extracted. This range is determined by (average−tolerance) to (average+tolerance).

Next Xmin of step S606, Ymin of step S608, Xmax of step S610, and Ymax of step S612 are determined by calculating the centroid of the ROI. The centroid of a non-self-intersecting closed polygon defined by n vertices $(x_0, y_0)$, $(x_1, y_1), \ldots, (x_{n-1}, y_{n-1})$ is the point $(C_x, C_y)$, where $$C_x = \frac{1}{6A}\sum_{i=0}^{n-1}(x_i + x_{i+1})(x_i y_{i+1} - x_{i+1} y_i)$$

$$C_y = \frac{1}{6A}\sum_{i=0}^{n-1}(y_i + y_{i+1})(x_i y_{i+1} - x_{i+1} y_i)$$

and where A is the polygon's signed area, $$A = \frac{1}{2}\sum_{i=0}^{n-1}(x_i y_{i+1} - x_{i+1} y_i)$$

In these formulas, the vertices are presumed to be numbered in order of their occurrence along the polygon's perimeter, and the vertex $(x_n, y_n)$ is presumed to be the same as $(x_0, y_0)$. Note that if the points are numbered in clockwise order the area A, computed as above, will have a negative sign; but the centroid coordinates will be correct even in this case.

Returning to FIG. 5, in step S510, the maximum and minimum coordinates of the ROI, along with the four coordinates of the two points of the horizon line and the angle of tilt of the horizon, are used to determine the vertices of the guidance polygon. Additionally, a pre-set margin distance "D" between the dynamic frame edge and ROI is used.

If the tilt angle is determined to be greater than or equal to zero, than the vertices of the compositional guidance frame are determined by:
Xleft_down=Xmin−D
Yleft_down=Ymin−D
Xleft_up=Xmin−D
Yleft_up=Ymax+D
Xright_down=Xmax+D
Yright_down=tan(tilt angle)*(Xmax−Xmin)+Yleft_down
Xright_up=Xmax+D
Yright_up=tan(tilt angle)*(Xmax−Xmin)+Yleft_up If the tilt angle is determined to be less than zero, than the vertices of the compositional guidance frame are determined by:
Xleft_down=Xmin−D
Yleft_down=tan(tilt angle)*(Xmax−Xmin)+Yright_down
Xleft_up=Xmin−D
Yleft_up=tan(tilt angle)*(Xmax−Xmin)+Yright_up
Xright_down=Xmax+D
Yright_down=Ymin−D
Xright_up=Xmax+D
Yright_up=Ymax+D Additionally, the compositional guidance polygon is positioned to position the centroid of the ROI near the closest intersection of imaginary horizontal and vertical lines that divides the dynamic frame in nine equal parts according to the Rule of Thirds.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors that are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

While aspects of the present disclosure have been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for capturing an image using an image acquisition device, the method comprising:
determining that at least one area of an image to be captured has been selected; analyzing geometrical and compositional properties of an area surrounding the at least one area;
providing a dynamic compositional guideline based on a result of analyzing the geometrical and compositional properties, wherein the dynamic compositional guideline is a convex polygon superimposed on the image to be captured and wherein a shape of the dynamic compositional guideline changes based on a movement of the image acquisition device; and
indicating when the image to be captured should be captured based on a position of the dynamic compositional guideline relative to the image to be captured.

2. A method according to claim 1, wherein a shape of the dynamic compositional guideline changes based on changing a magnification value associated with a lens of the image acquisition device.

3. A method according to claim 1, wherein an indication to capture the image to be captured occurs when the position of the dynamic compositional guideline is a rectangle surrounding the at least one area of the image to be captured.

4. A method according to claim 1, wherein the at least one selected area is selected by a user.

5. A method according to claim 1, wherein the geometrical and compositional properties are analyzed using a rule of thirds.

6. A method according to claim 1, wherein the geometrical and compositional properties are analyzed to determine a strong line.

7. A method according to claim 6, wherein the analysis includes Canny edge detection and Hough transformation.

8. A method according to claim 1, wherein a centroid of the at least one area of the image to be captured is calculated.

9. An image acquisition apparatus comprising:
a memory;
a bus; and
a system control unit connected to the memory via the bus, the system control unit configured to:
determine that at least one area of an image to be captured has been selected; analyze geometrical and compositional properties of an area surrounding the at least one area;
provide a dynamic compositional guideline based on a result of analyzing the geometrical and compositional properties, wherein the dynamic compositional guideline is a convex polygon superimposed on the image to be captured and wherein a shape of the dynamic compositional guideline changes based on a movement of the image acquisition device; and
indicate when the image to be captured should be captured based on a position of the dynamic compositional guideline relative to the image to be captured.

10. An image acquisition apparatus according to claim 9, wherein a shape of the dynamic compositional guideline changes based on changing a magnification value associated with a lens of the image acquisition device.

11. An image acquisition apparatus according to claim 9, wherein the image acquisition apparatus further comprises an image display unit, wherein an indication displayed on the image display unit to capture the image to be captured occurs when the position of the dynamic compositional guideline is a rectangle surrounding the at least one area of the image to be captured.

12. An image acquisition apparatus according to claim 9, wherein the at least one selected area is selected by a user.

13. An image acquisition apparatus according to claim 9, wherein the system control unit analyzes the geometrical and compositional properties using a rule of thirds.

14. An image acquisition apparatus according to claim 9, wherein the system and control unit analyzes the geometrical and compositional properties to determine a strong line.

15. An image acquisition apparatus according to claim 14, wherein the analysis includes Canny edge detection and Hough transformation.

16. An image acquisition apparatus according to claim 9, wherein the system control unit calculates a centroid of the at least one area of the image to be captured.

* * * * *